United States Patent [19]
Carson

[11] Patent Number: 4,726,918
[45] Date of Patent: Feb. 23, 1988

[54] PACKING ELEMENT

[76] Inventor: William Carson, 18210 S.E. 121st Pl., Renton, Wash. 98056

[21] Appl. No.: 902,969

[22] Filed: Sep. 2, 1986

[51] Int. Cl.⁴ .................................................. B01F 3/04
[52] U.S. Cl. ................................ 261/94; 261/DIG. 72
[58] Field of Search ............................ 261/DIG. 72, 94

[56] References Cited

U.S. PATENT DOCUMENTS

| Des. 232,237 | 7/1974 | La Borde | 261/DIG. 72 |
| 1,141,266 | 6/1915 | Raschig | 261/DIG. 72 |
| 1,796,501 | 3/1931 | Berl | 261/DIG. 72 |
| 3,957,931 | 5/1976 | Ellis et al. | 261/DIG. 72 |
| 4,086,307 | 4/1978 | Glaspie | 261/DIG. 72 |
| 4,115,269 | 9/1978 | Bennett | 261/DIG. 72 |
| 4,122,011 | 10/1978 | Strigle | 261/DIG. 72 |
| 4,203,935 | 5/1980 | Hackenjos | 261/DIG. 72 |

FOREIGN PATENT DOCUMENTS

| 1769581 | 8/1977 | Fed. Rep. of Germany | 261/94 |
| 51-16035 | 5/1976 | Japan | 261/94 |
| 2093728 | 9/1982 | United Kingdom | 261/94 |
| 712116 | 1/1980 | U.S.S.R. | 261/DIG. 72 |
| 990278 | 1/1983 | U.S.S.R. | 261/DIG. 72 |

Primary Examiner—Tim Miles
Attorney, Agent, or Firm—Thomas W. Secrest

[57] ABSTRACT

This invention is a packing for use in a packed tower. The packing has four axes and six webs and is symmetrical around each axes. The packing is of a geometrical configuration that with one of the axes pointing downwardly and the other three axes pointing upwardly and above the downwardly pointing axes the fluid can flow towards the center of the packing into an opening at its center. In the configuration with the three axes pointing downwardly and the one axis pointing upwardly the fluid is directed away from the center of the packing and flows off of the webs. With this geometrical configuration the flow of the fluid is evenly distributed throughout the packed bed.

19 Claims, 14 Drawing Figures

PACKING ELEMENT

THE BACKGROUND OF THE INVENTION

This invention relates to a packing element for a tower. The element is of a new and useful shape. The element, when poured randomly in a tower or column to form a packed bed, produces a large effective surface for a gas-liquid operation and a liquid-liquid operation such as, gas absorption, distillation, liquid extraction, chemical reaction and other similar operations that employ mass and heat transfer.

These operations are conducted with the light liquid normally flowing upwardly through a packed bed of packing elements and the heavy liquid flowing downwardly opposite to the flow of the light fluid. The heavy fluid always flows downwardly and is driven by gravity. In some cases the light fluid rises due to bouyant forces as in liquid-liquid extraction. In gas-absorption the light fluid can flow in the same direction or perpendicular to the heavy fluid flow. The pressure differentials across the packed bed drive the light fluid through the bed.

The most common packings are of two general types: surface type packing and filament type packing. The surface type packing produces a more serpentine path for the fluids as they pass through the bed than does the filament type packing. This results in higher pressure drops for surface type packing and better distribution of fluids than does the filament type packing.

The main categories of surface type packing are rings (as disclosed in Raschig U.S. Pat. No. 1,141,266, and Eckert U.S. Pat. No. 3,266,787) and saddles (as disclosed in Berl U.S. Pat. No. 1,796,501, Leva U.S. Pat. No. 2,639,909.)

The filament type packing includes toroidal and spherical packets of filaments. The toroidal filament packet was disclosed initially in Teller U.S. Pat. No. 2,867,425 and then in Doyne U.S. Pat. No. 3,752,453. The spherical filament packet was disclosed in Fattinger U.S. Pat. No. 4,072,736 and Kackenjos, U.S. Pat. No. 4,203,935.

The surface type packing has heavy fluid cascading over its upper surface driven by gravity and has heavy fluid dispersed over its underside surface using the velocity head of the light fluid. A relatively high pressure drop in light fluid is necessary for good wetting of this type of packing. A lack of symmetry in these packing shapes causes local areas of varying void densities within the packed bed. This creates a preferential path of flow and results in poor contact between the heavy fluid and the light fluid. The curved surfaces of surface type packings provide sites for stagnant heavy fluids to be caught within the packed bed. An extremely high pressure drop across the packed bed can occur during high loading thereby forcing the light fluid to by-pass the packed bed at the wall of the tower or column. In this situation the packed bed is not functioning as designed as it is not effective.

Filament type packing does not distribute the heavy or light fluid due to its geometry. With filament type packing heavy fluid trickles over the filaments coating the total surface (if the heavy fluid is distributed well initially over the bed's cross section.) In this circumstance good wetting of the surface of the filament at low pressure drops is possible. To produce good interfacial contact both heavy and light fluids must be well distributed initially. The pressure drop that is necessary within a packed bed for distillation cannot be adequately achieved with filament type packing. This results in a restriction of the use of filament type packing.

A packed bed settles and results in a smaller volume as compared to the initial volume of the bed. Both surface type packing and filament type packing produce beds that settle. Bed stability and resistance to nesting depends on packing geometry and the configuration of the packing.

A BRIEF DESCRIPTION OF THE INVENTION

The packing element of this invention is more symmetrical than the configuration of other packings such as surface type packing and filament type packing. It has four axes of symmetry in four different planes. All other packings have two or less planes with axes of symmetry for their major components. The major components of these packings are defined as surfaces and/or filaments, but not ridges, protrusions, depressions or bumps. When this packing element is randomly poured to form a packed bed less possible configurations exist for this invention as compared to other packing. The mass transfer and heat transfer performances of this packing are much more predictable from one randomly poured packed bed to another as compared with packed beds of surface type packing and filament type packing.

The open cross-sectional and closed cross-sectional area are constant irrespective of rotation about any axis of spatial geometry. This characteristic is unique to this invention and enhances uniform bed characteristics even with a random pouring of packing elements.

The webs of this packing element act to compress gas or gather light fluid, and dispurse liquid or heavy fluid when one of its axes is oriented generally upward and the other three axes are oriented generally downward. When one of the axis is oriented generally downward and the other three axes are oriented generally upward, the webs act to expand gas or to disperse light fluid, and gather liquid or heavy fluid. The probability of these two general orientations occurring is 50%. This phenomena causes a continuous even distribution of both heavy and light fluids producing a large effective surface. Mass and heat transfer will be high and much more predictable from one randomly poured packed bed to another.

The packing element is so designed that no fluid can be captured or held by its geometry. All of the surfaces are flat with the exception of small ridges and the apex of the axes is open. A packed bed produced from randomly pouring this packing element will hold no stagnant fluid and will drain completely when not operating.

The packing element shape with all its surfaces diverging from both its center and symmetric axes; its six V-edges; and, its four triple edge corners combine to produce a packing that pours to create a very stable bed. However, the bed is easily disassembled. Also, the surfaces of one packing element contact other elements surfaces in a random bed such as edge to flat, edge to edge, or point to flat but rarely flat to flat. This relationship maintains a very high degree of effective packing surface, and a turbulent exchange of the heavy liquid at the inter-piece contact points.

THE DRAWINGS

In the drawings:

FIG. 10, 11 and 12 are for another species of a web of the packing and illustrate a riged network of ribs covering the surface on either side of the packing and with the ribs perpendicular to the surface of the base of the packing and wherein FIG. 10 is a top plan view;

FIG. 11 is an edge elevational view;

FIG. 12 is an end edge elevational view;

THE SPECIFIC DESCRIPTION OF THE INVENTION

Figure 1:
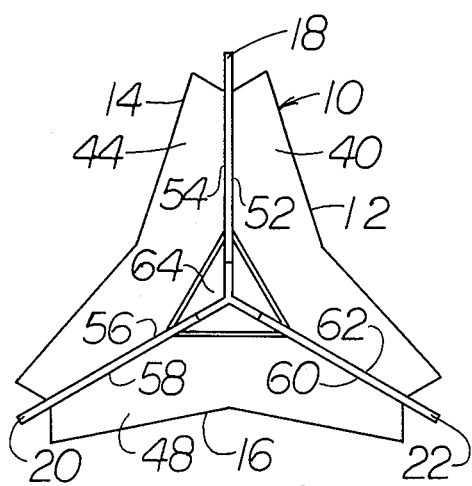
FIG. 1 is a top plan view of the packing.

This invention is a tower packing of unique and symmetrical shape or configuration. The shape of the packing has four axis emerging from its center, which is an apex. Each axis is separated from all of the other axes by an angle of about 109.5°. There are six webs connecting the four axes. One edge from each of three different webs are attached at each axis and these webs are radially separated, about each axis by 120°. The outward unattached edge of each of the six webs (if straight) would follow the six edges of a tetrahedron, see FIG. 6 in the drawings. The webs do not continue completely inwardly to the axes apex but are truncated in this regard so as to leave an open region in the center of the packing for the flow of both heavy liquid and light liquid. The six webs are identical with respect to the plane dimension. If necessary to enhance the manufacturing of the packing a different surface topography can exist.

In FIGS. 1 through 6 it is seen that there is a packing 10 comprising six webs, 12, 14, 16, 18, 20 and 22. The web may be flat and has two surfaces.

Figure 7:
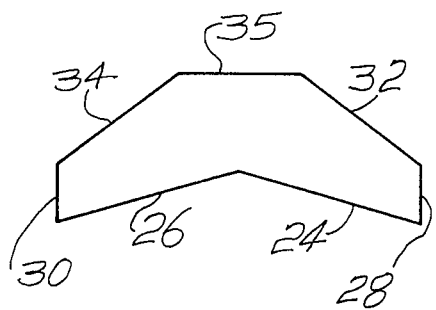
FIG. 7 is a top plan view of one web of the packing with smooth surfaces.

In FIG. 7 there is a plan view of a web. The web is of a modified swept-back wing configuration. There is an outer edge 24 and an outer edge 26. These two outer edges meet at their inner end and are at an angle with each other. The outer end of the outer edge 24 joins an end edge 28. The outer end of the outer edge 26 joins an end edge 30. The inner end of the end edge 28 meets with an axial edge 32. The inner edge of the end edge 30 meets with an axial edge 34. The inner edge of the axial edges 32 and 34 meet with a straight inner edge 35.

Figure 6:
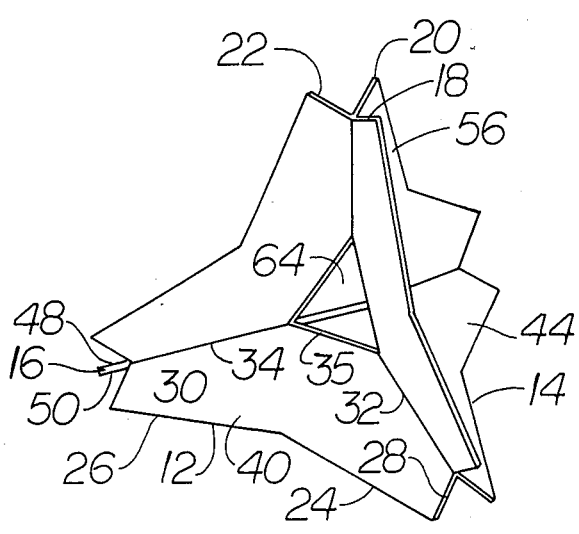
FIG. 6 is a dimetric projection of the packing.

FIG. 6 is a dimetric view of the packing 10 and discloses the six webs. Also, FIG. 6 discloses the opening 64 as defined by the inner edges 35 of the webs.

Figure 2:
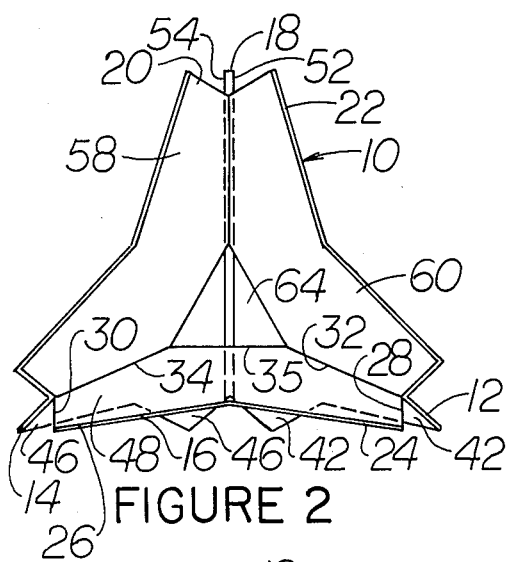
FIG. 2 is a front elevational view of the packing.
Figure 3:
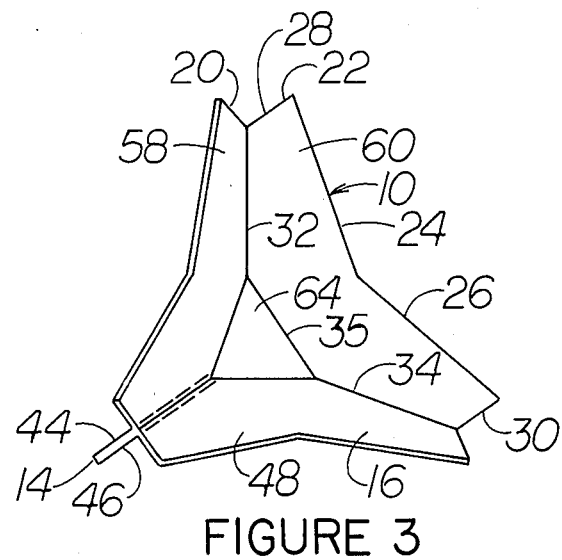
FIG. 3 is a front elevational view of the packing rotated approximately 30° with respect to FIG. 2.

In FIG. 3 rotated 30° counterclockwise with respect to FIG. 2, it is seen that the upright right web 22 is illustrated as a substantially flat surface and is of true configuration.

With reference to FIG. 3 and web 22 it is seen that the surface 60 is in view. The interior angle between the end edge 28 and the axial edge 32 is approximately 126.5°. The interior angle between the end edge 30 and the axial edge 34 is approximately 126.5°. The interior angle between the axial edge 34 and the inner edge 35 is approximately 144.5°. The inner angle between the axial edge 32 and the inner edge 35 is approximately 144.5°. The exterior angle between the outer edge 26 and the outer edge 24 can vary depending on the length of the end edges 30 and 28. The reader is to understand that by varying the length of the inner edge 35 the size of the opening 64 can be varied. For example, if the length of the inner edge 35 is lessened then the size of the opening is decreased. Conversley, if the length of the inner edge 35 increased then the size of the opening 64 is increased. This is a parameter to be determined. For example, in one application it may be desirable to have a small opening 64 while in another application it may be desirable to have a large opening 64. The ultimate use of the packing 10 will have an affect on detemining the size of the opening 64. The length of the end edges 30 and 28 can vary and with this variation in their length the surface area of the two surfaces of a web will vary. Further, there can be a variation of the exterior angle between the outer edges 24 and 26. Again, the surface areas of the webs can be designed for a particular condition so as to have optimum results.

The angle between two adjacent surfaces of two adjacent webs is approximately 120°. For example, the angle between the surface 58 of the web 20 and the surface 48 of the web 16 is 120°. The angle between the surface 60 of the web 22 and the surface 48 of the web 16 is approximately 120°. The angle between the surface 62 of the web 22 and the surface 40 of the web 12 is approximately 120°. The angle between the surface 52 of the web 18 and the surface 40 of the web 12 is approximately 120°. The angle between the surface 54 of the web 18 and the surface 44 of the web 14 is approximately 120°. The angle between the surface 44 of the web 14 and the surface 56 of the web 20 is approximately 120°. The angle between the surface 62 of the web 22 and the surface 52 of the web 18 is approximately 120°. The angle between the surface 54 of the web 18 and the surface 56 of the web 20 is approximately 120°. The angle between the surface 58 of the web 20 and the surface 60 of the web 22 is approximately 120°. The angle, see FIG. 5, between the surface 46 of the web 14 and the surface 42 of the web 12 is approximately 120°. The angle between the surface 42 of the web 12 and the surface 50 of the web 16 is approximately 120°. The angle between the surface 50 of the web 16 and the surface 46 of the web 14 is approximately 120°.

FIG. 7 is a plan view of a web with no topography or a flat surface.

Figure 8:
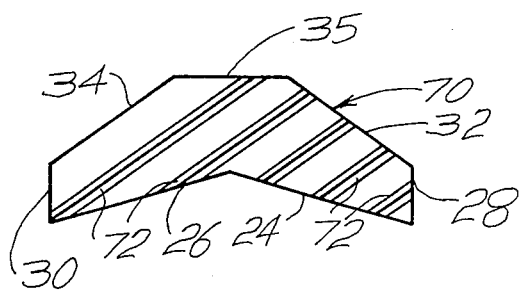
FIG. 8 is an illustration of another species of a web revealing a rigded network of ribs covering the surfaces of the packing and which ribs run parallel with one of the oblique edges of the web.

In FIG. 8, a top plan view of web 70, it is seen that on the surface that there are a plurality of ridges 72. These ridges 72 are parallel to an axial edge 32 or an axial edge 34. The height of the ridge 72 above the surface of the web 70 can vary although an appropraite height can be 0.10 inch. The reader is to understand that the ridges 72 can be on both surfaces of the web 70 or on only one surface depending upon the use of the packing comprising the web 70.

Figure 9:
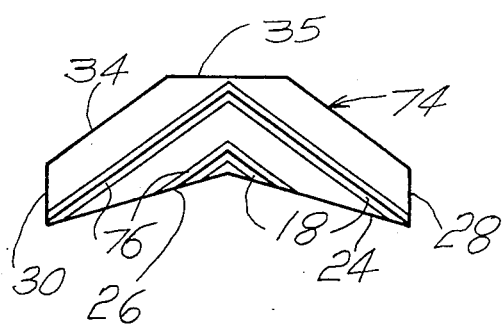
FIG. 9 is a top plan view of a web having ridges in a herringbone pattern.

In FIG. 9 there is illustrated a web 74 having ridges in the configuration of a herringbone. There is a ridge 76 meeting with the ridge 78. The ridge 76 is substantially parallel to the actual edge 34 and the ridge is substantially parallel to the actual edge 32. Again, the height of the ridge 76 or the ridge 78 above the surface of the web 74 can vary but an appropriate height can be approximately 0.10 inch. The reader is to understand that the ridges 76 and 78 can be on one surface of the web 74 or on both surfaces of the web 74 depending upon the use of the packing comprising the web 74.

Figure 10:
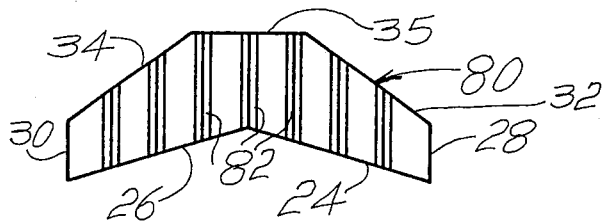
Figure 11:
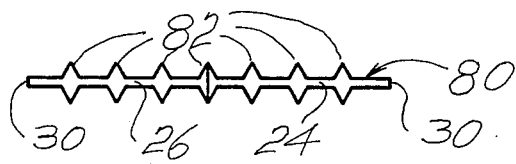

In FIG. 10, a plan view of the web 80, it is seen that there are a plurality of parallel ridges 82. The parallel ridges 82 can be perpendicular to the base of the web 80 or parallel to the end edges 28 and 30. Again, the ridges 82 can have a height above the surface of the web 80 any reasonable height and a typical height can be 0.10 inches FIG. 11 is an edge elevational view of the web 80 and illustrates the ridges 82.

Figure 12:

FIG. 12 is an end elevational view of the web 80 and illustrates the ridges 82.

The ridges 72, 76 and 78, and ridges 82 serve a useful purpose in the promotion of turbulence in the heavy fluid film adjacent to the surface of the web. Further, these ridges also serve another useful purpose in that they prevent flat surfaces of different pieces of packing contacting each other and, to a degree, cementing together these two flat surfaces so as to lessen the area of surface contact of the packing. With the ridges there is, substantially, no possibility of flat surfaces of two adjacent pieces of packing contacting each other so as to lessen surface area. The ridges do provide a degree of separation between the webs of adjacent pieces of packing. In other words, the ridges have a beneficial effect of assisting in maintaining the large contact surface area of the packing.

The packing can, with or without ridges, provide a large surface area for liquid to liquid contact or for gas to liquid contact. The packing 10 is to promote the mass transfer and heat tranfer between fluids such as liquid and liquid or gas and liquid. The packing 10 is to promote uniform distribution of the flow of the fluids without stagnant pockets for the fluid. The packing 10 distributes the flow of fluid, both light and heavy fluids, and has an efficient surface area due to the large surface of the webs. The opening 64 assists in the flow of fluid and prevention of stagnant pockets of fluid in the packing.

A packing tower requires a large volume of packing 10. Generally, a packing tower is a vertical right circular cylinder. The diameter of this cylinder and the height of this cylinder vary with the use of the packing tower. Near the bottom of the packing tower there is a support plate. The packing 10 can be placed on top of the support plate. In that part of the packing tower below the support plate there is apparatus and means for introducing a light fluid to flow upwardly through the packing 10 in the packing tower. Above the packing in the packing tower there is a distribution means or a distributor for introducing heavy fluid on top of the packing 10. The heavy fluid descends through the packing 10 and the light fluid ascends through the packing 10. The packing 10 promotes the contact of the heavy fluid and the light fluid so as to have mass transfer and heat transfer between the light fluid and the heavy fluid. With the heavy fluid flowing downwardly through the packing 10 and the light fluid flowing upwardly through the packing 10 there is a counter-current flow of the two fluids. It is possible to have the heavy fluid and the light fluid flow in the same direction such as the heavy fluid and the light fluid flowing downwardly through the packing 10.

Also, under certain circumstances the heavy fluid can be introduced at the top of the packed tower and flow downwardly through the packing 10. Then, the light fluid, such as a gas, can be introduced into the packed tower in a horizontal direction or at a right angle to the downward flow of the heavy fluid. With this packing having the opening 64 it is possible to have this arrangement of fluid flow with the heavy fluid descending and the light fluid being introduced into the packed tower horizontally or at a right angle to the flow of the heavy fluid. Again, the opening 64 is beneficial in this regard and makes it possible to introduce the two fluids to each other in this manner.

The large surface area of the six webs of the packing 10 in conjunction with the opening 64 makes this a versatile packing which can be used for counter current flow of the two fluids or parallel flow of the two fluids or flow of the two fluids at a right angle to each other. Parallel flow of the two fluids is also known as concurrent flow of the two fluids.

Figure 14:
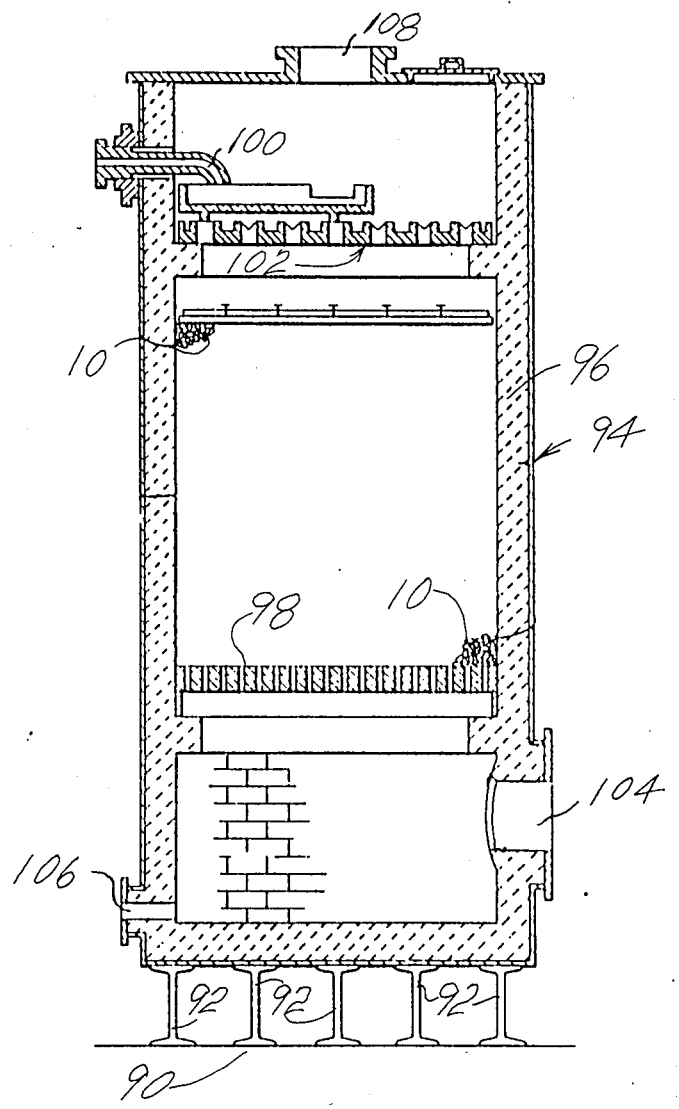

In FIG. 14, there is illustrated a packing tower. There is the ground or floor 90. Positioned on the floor 90 are supports 92 for the packing tower 94. The packing tower is in the configuration of a vertical right circular cylinder 96.

Below the middle of the packing tower 94 there is a horizontal support plate 98 having a plurality of openings to allow fluid to flow both upwardly and downwardly. There is positioned on this support plate 98 and in the vertical right circular cylinder 96 the packing 10.

Figure 4:
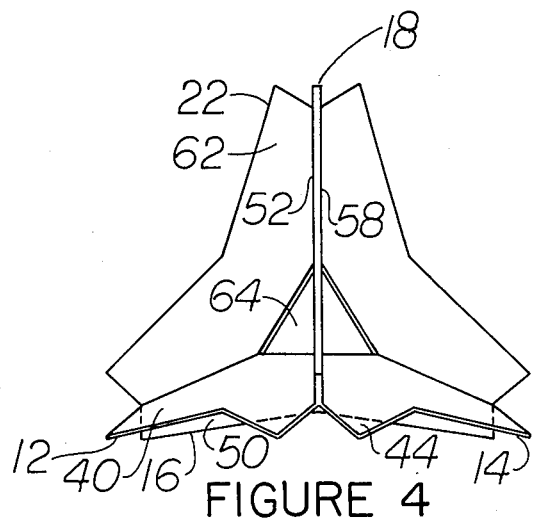
FIG. 4 is a front elevational view of the packing rotated approximately 60° with respect to FIG. 2.
Figure 5:
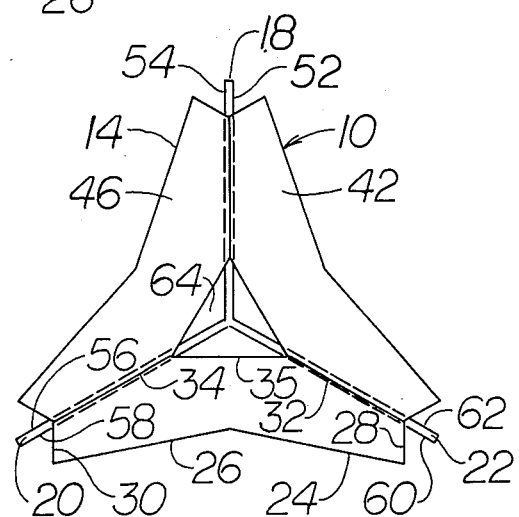
FIG. 5 is a bottom plan view of the packing.

The web 12 has an upper surface 40, see FIG. 1, and a lower surface 42, see FIG. 5. The web 14 has an upper surface 44, see FIG. 1, and a lower surface 46, see FIG. 5. The web 16 has an upper surface 48, see FIG. 1, and a lower surface 50, see FIG. 5. The web 18 has a surface 52 and also a surface 54. The surface 54 is clearly visible in FIG. 4 The web 20 has a surface 56 and a surface 58. The web 22 has a surface 60 and a surface 62.

The six webs meet along their axial edges 32 and/or 34. Since the axial edges 32 and 34 of a web do not meet but join with an inner edge 35 the six webs of the packing 10 define an opening 64. The opening 64 is inbounded by the six inner edges 35 of the six webs of the packing 10.

With references to FIGS. 1-6 it is seen that FIG. 1 is a plan view such as a top plan view of the packing 10. The opening 64 is disclosed as defined by the inner edge 35 of the six webs.

In FIG. 2, a front elevational view of the packing 10, the opening 64 is disclosed. Also, the angles of the various webs with respect to each other are disclosed.

FIG. 3 is a front elevational view of the packing 10, as rotated 30° counterclockwise with respect to FIG. 2. Again, the opening 64 between the web as defined by the inner edges 35 is disclosed.

FIG. 4 is a front elevational view of the packing 10 as rotated 60° counterclockwise with respect to FIG. 2. The opening 64 is disclosed.

FIG. 5 is a bottom plan view of the packing 10. The opening 64 is disclosed.

In the upper part of the tower 94 there is an inlet 100 for introducing heavy fluid to the distributor 102. The distributor 102 comprises a number of weirs on a plate and has a number of openings or passageways to allow fluid to flow both upwardly and downwardly.

In the lower right part of the packing tower 94 there is a ligh fluid inlet 104. The light fluid can be gas or liquid. Also, in the lower part of the packing tower 94, and below the light fluid inlet 104, there is a lower outlet 106 for the heavy fluid to leave the packing tower 94. In the upper part of the tower 94 there is an upper outlet 108 to allow light fluid to leave the tower 94. FIG. 14 is a general schematic illustration of the packing tower. For the purpose of this patent application FIG. 14 shows a support plate 98 supporting the packing 10.

Figure 13:
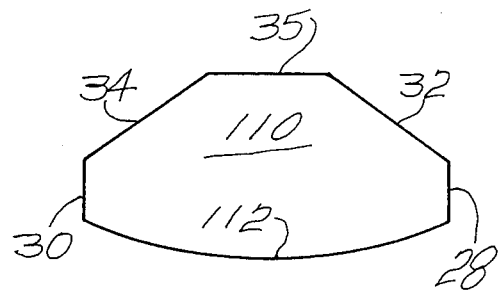
FIG. 13 is a top plan view of one web having a curved edge or an arcuate edge; and, FIG. 14 is a schematic illustration of packed tower with the subject packing in position.

In FIG. 13 there is another web 110 having an inner edge 35, an axial edge 34, an end edge 28 and an end edge 30. The outer ends of the end edges 28 and 30 are connected by a curved trailing edge 112. This is in contrast to the webs illustrated in the other figures.

In FIG. 1, a top plan view of the packing 10, the observer is looking down on the packing. The webs are sloping downwardly, see FIG. 2 and away from the opening 64. If the observer will imagine a fluid flowing downwardly onto the packing 10 of FIG. 1 the observer will realize that upon dropping onto one of the downwardly sloping webs that the fluid flows away from the opening 64.

Now, in FIG. 5, a bottom plan view of the packing 10, it is seen that the webs slope inwardly toward the opening 64. If the observer will consider a fluid dropping or flowing onto one of the webs the observer will realize that the fluid is flowing inwardly toward the opening 64 and will flow through the opening 64. In the random distribution of the packing in the packing tower 94 there is a good possibility that approximately one-half of the packing 10 will be positioned so that the packing is arranged as in FIG. 1 with the three of four axes, see FIG. 6, generally pointing downwardly and the other half of the packing 10 will be positioned as in FIG. 5 with the three of four axes directed upwardly.

From this it is seen that the fluid in descending in the packing tower will flow inwardly toward the opening 64 and then flow outwardly from the opening 64 upon flowing through the various levels of packing 10.

From the foregoing it is seen that I have provided a packing comprising a plurality of webs 12, 14, 16, 18, 20 and 22 with each of said webs having an axial edge identified as a first axial edge 32 and a second axial edge 34 with said webs joining at their axial edges to form said packing, and each of said webs being substantially planer and having a surface identified as a first surface and having a surface identified as a second surface. Also, said packing has at least one of said webs having an inner edge 35 joining with said first axial edge 32 and joining with said second axial edge 34, said inner edge of said webs defining an opening in said packing, and said packing being unitary. In said packing said plurality of webs being six webs identified as a first web, a second web, a third web, a fourth web, a fifth web and a sixth web with said first web and said second web and said third web joining a first junction, and with said second web and said fourth web and said sixth web joining at a second junction, and with said first web and said fifth web and said sixth web joining at a third junction, and with said third web and said fourth web and said fifth web joining at a fourth junction.

The packing is useful as it can be used in a packed tower for the interaction of two fluids such as a liquid and a gas or a heavy liquid and a light liquid.

The packing can be made of an appropriate plastic, a suitable ceramic, metal and glass.

From the foregoing and having presented my invention what I claim is:

1. A packing consisting:
   a. of six webs;
   b. each of said webs having an axial edge identified as a first axial edge and oriented to a axis of symmetry;
   c. each of said webs having an axial edge identified as a second axial edge and oriented to an axis of symmetry;
   d. said webs joining at their axial edge and the symmetrical axis to form said packing, and;
   e. each of said webs having two surfaces identified as a first surface and as a second surface.

2. A packing according to claim 1 and comprising:
   a. at least one of said webs having an inner edge joining with said first axial edge and joining with said second axial edge; and,
   b. said inner edge of said at least one of said webs defining an opening in said packing.

3. A packing according to claim 1 and comprising:
   a. said packing being unitary.

4. A packing according to claim 1 and comprising:
   a. said webs identified as a first web, a second web, a third web, a fourth web, a fifth web and a sixth web;
   b. said first web and said second web and said third web joining at a first junction;
   c. said second web and said fourth web and said sixth web joining at a second junction;
   d. said first web and said fifth web and said sixth web joining at a third junction; and,
   e. said third web and said fourth web and said fifth web joining at a fourth junction.

5. A packing according to claim 4 and comprising:
   a. some of said webs having an inner edge joining with said first axial edge and joining with said second axial edge; and,
   b. said inner edge of said webs defining an opening in said packing.

6. A packing according to claim 5 and comprising:
   a. said packing being unitary.

7. A packing according to claim 4 and comprising:
   a. the smaller angle between adjacent surfaces of said first web and said second web being about 120°;
   b. the smaller angle between adjacent surfaces of said first web and said sixth web being about 120°;
   c. the smaller angle between adjacent surfaces of said first web and said third web being about 120°;
   d. the smaller angle between adjacent surfaces of said second web and said third web being about 120°;
   e. the smaller angle between adjacent surfaces of said second web and said sixth web being about 120°;
   f. the smaller angle between adjacent surfaces of said second web and said fourth web being about 120°;
   g. the smaller angle between adjacent surfaces of said fourth web and said fifth web being about 120°;
   h. the smaller angle between adjacent surfaces of said first web and said fifth web being about 120°;
   i. the smaller angle between adjacent surfaces of said third web and said fourth web being about 120°;
   j. the smaller angle between adjacent surfaces of said third web and said fifth web being about 120°; and,
   k. the smaller angle between adjacent surfaces of said fourth web and said sixth web being about 120°.

8. A packing according to claim 4 and comprising:
   a. said first web, said second web and said third web uniting at a first axis;

b. said second web, said fourth web, and said sixth web uniting at a second axis;
c. said first web, said fifth web and said sixth web uniting at a third axis; and,
d. said third web, said fourth web and said fifth web uniting at a fourth axis.

9. A packing according to claim 8 and comprising:
a. the least angle between said first axis and said second axis being about 109.5°;
b. the least angle between said sixth axis and said third axis being about 109.5°;
c. the least angle between said third axis and said fourth axis being about 109.5°;
d. the least angle between said first axis and said fourth axis being about 109.5°;
e. the least angle between said second axis and said fourth axis being about 109.5°; and,
f. the least angle between said third axis and said fourth axis being about 109.5°.

10. A packing according to claim 8 and comprising:
a. said packing being symmetrical about each axis.

11. A packing according to claim 8 and comprising:
a. the ratio of open cross-sectional area to closed cross-sectional area of said packing is constant irrespective of rotation about any axis of spatial geometry.

12. A packing according to claim 9 and comprising:
a. said packing being symmetrical about each axis.

13. A packing according to claim 9 and comprising:
a. the ratio of open cross-sectional area to closed cross-sectional area of said packing is constant irrespective of rotation about any axis of spatial geometry.

14. A packing according to claim 1 and comprising:
a. on at least one surface of a web a plurality of ridges; and,
b. said ridges being parallel to said axial edge.

15. A packing according to claim 1 and comprising:
a. on at least one surface of a web a plurality of ridges;
b. some of said ridges being parallel to said first axial edge; and,
c. some of said ridges being parallel to said second axial edge.

16. A packing according to claim 1 and comprising:
a. on at least one surface of a web a plurality of ridges; and,
b. said ridges being at an angle to said axial edge other than parallel and being at an angle other than normal.

17. A combination of a tower and a packing made by the method comprising:
a. said tower made by a method comprising:
  1. constructing said tower in an upright configuration;
  2. forming a support in said tower for supporting said packing;
  3. forming a means for introducing a first fluid into said tower;
  4. forming a means for introducing a second fluid into said tower;
b. said packing made by a method comprising:
  5. forming only six webs with each web having a surface identified as a first surface and having a surface identified as a second surface;
  6. forming each of said webs to have an axial edge identifed as a first axial edge and oriented to an axis of symmetry;
  7. forming each of said webs to have an axial edge identified as a second axial edge and oriented to an axis of symmetry; and,
  8. joining said webs at their axial edges to form packing; and,
c. said combination made by the method comprising:
  9. adding said packing to said tower.

18. A combination of a tower and a packing according to claim 17 and comprising:
a. at least one of said webs having an inner edge joining with said first axial edge and joining with said second axial edge; and,
b. forming said inner edge of at least one of said webs to define an opening in said packing.

19. A combination of a tower and a packing according to claim 17 and comprising:
a. said packing being unitary.

* * * * *